United States Patent [19]

Nishimura et al.

[11] 4,179,706
[45] Dec. 18, 1979

[54] COLOR CAMERA SYSTEM

[75] Inventors: Toshimichi Nishimura, Tama; Seisuke Yamanaka, Mitaka; Masaru Shimada, Yokohama, all of Japan

[73] Assignee: Sony Corporation, Tokyo, Japan

[21] Appl. No.: 863,596

[22] Filed: Dec. 22, 1977

[30] Foreign Application Priority Data

Jan. 14, 1977 [JP] Japan .................................... 52-3316

[51] Int. Cl.² ............................................ H04N 9/07
[52] U.S. Cl. ................................................. 358/44
[58] Field of Search ............................ 358/41, 43, 44

[56] References Cited
U.S. PATENT DOCUMENTS 3,946,434  3/1976  Shimada ................. 358/44

*Primary Examiner*—Richard Murray
*Attorney, Agent, or Firm*—Hill, Van Santen, Steadman, Chiara & Simpson

[57] ABSTRACT

A color camera system is disclosed in which a dot-like signal which appears on a TV screen caused by a processing error is effectively eliminated. A pick up device with a color coding filter derives composite signals containing color components modulated at a frequency $f_s$ where the composite signals are obtained in opposite phase line by line. An adder circuit is provided to mix the composite signals obtained from two adjacent lines. A detector detects the 2nd harmonic of $f_s$ from the mixed composite signals. A dual gate MOSFET is provided to suppress a high frequency region of a luminance signal which is derived from the composite signals in response to the detected 2nd harmonic of $f_s$.

12 Claims, 13 Drawing Figures

COLOR CAMERA SYSTEM

INTRODUCTION

This invention relates to a solid state color camera which employs a single solid state area sensing device with a color coding filter.

CROSS REFERENCE TO RELATED APPLICATIONS

Cross reference is made to United States application, Ser. No. 561,922, filed Mar. 25, 1975, and assigned to the same assignee as the present application. Application Ser. No. 561,922 has been allowed, and the initial issue fee was forwarded to the Patent Office for payment on Nov. 10, 1977.

A second cross reference is made to a second copending application, Ser. No. 783,062, filed Mar. 30, 1977, which is also assigned to the same assignee as the present invention.

BACKGROUND OF THE INVENTION

As is known, solid state color cameras as generally referred to in the introduction above have a sampling error which deteriorates the quality of the picture being picked up. The aforesaid application, Ser. No. 561,922 describes a method and means for obtaining relatively high resolution with a sensing device having a limited number of picture elements.

A second form of solid state color camera is also described in this aforementioned application Ser. No. 561,922, which shows one type of charge coupled device (CCD) color camera system having a single chip with a coding filter. In this system, a luminance signal has its frequency range extended for better resolution by mixing signals on two successive horizontal scanning lines provided that there exists a strong vertical correlation between signals from adjacent scanning lines. If the conditions of the vertical correlation are not established, there appears B/W dots or color dots in the reproduced image. In order to reduce the deterioration of the reproduced image, a method is described in the aforesaid application, Ser. No. 783,062 for accomplishing this.

BRIEF SUMMARY OF THE INVENTION

It is an object of the present invention to provide an improved color camera system.

It is another object of the invention to provide a color camera system in which dot-like signals are substantially prevented from appearing on a TV screen.

The present invention relates to a color camera system of the type employing an image sensor array of the CCD type having a color coding filter with which at least two color components modulate a sub-carrier frequency $f_s$. The frequency $f_s$ is approximately 3.58 mHz when the direct NTSC conversion is used. A composite signal is derived from the signal picked up by the image sensor array and detected for a second harmonic of the frequency $f_s$. A luminance signal is generated from the composite signal. The high frequency region of the luminance signal is suppressed in response to the second harmonic.

The color camera system of the present invention in one form includes three primary colors which are modulated at a frequency $f_s$ and is obtained in opposite phase, line-by-line. Means is provided for mixing the composite signals from the two adjacent lines. A luminance signal is generated from the mixed composite signal. A detector determines the presence of a second harmonic component from the mixed composite signal, and the frequency response of the luminance signal is controlled in response to the second harmonic.

DESCRIPTION OF THE PREFERRED EMBODIMENTS

Figure 1:
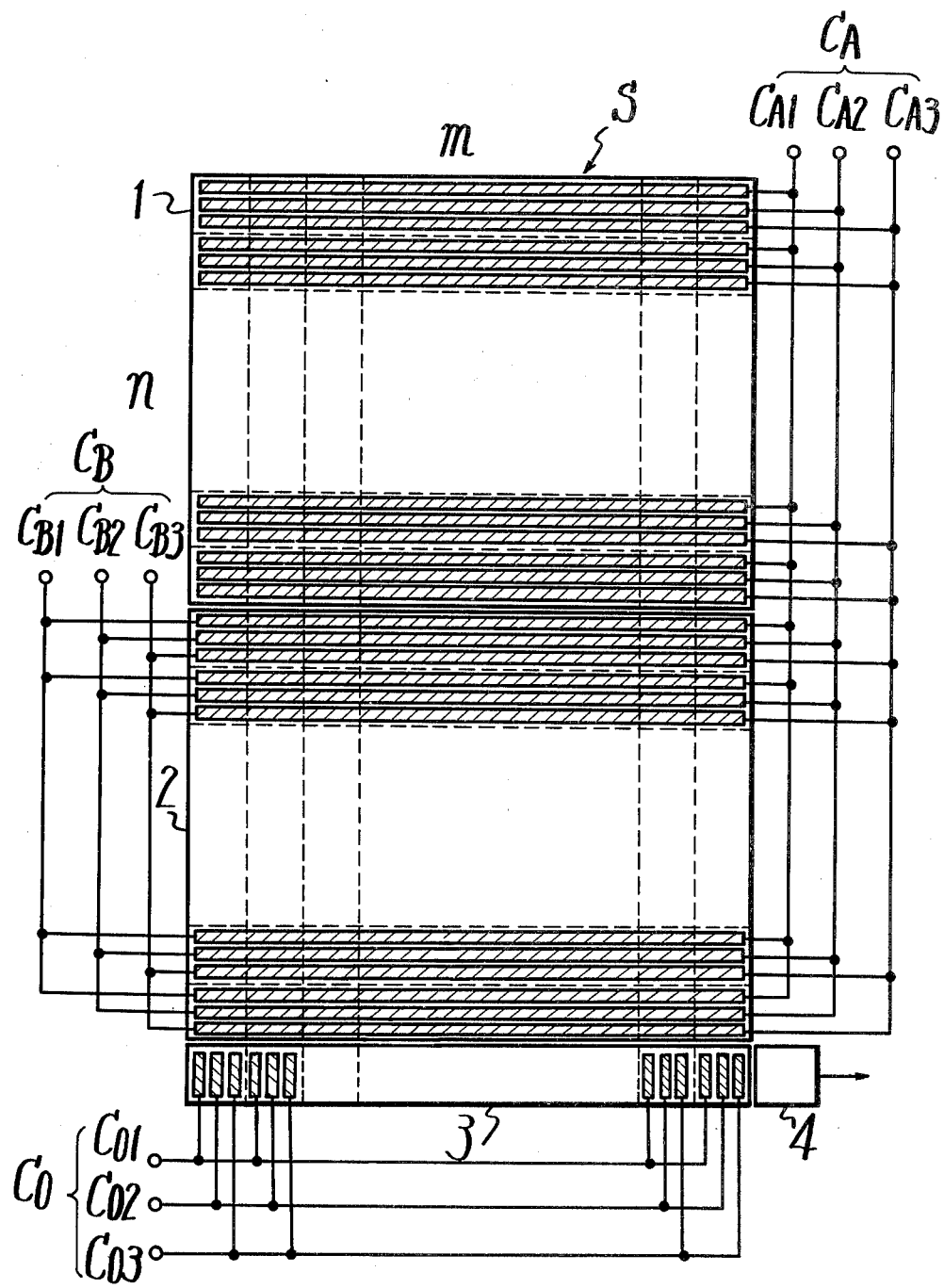
FIG. 1 shows a well-known frame transfer type CCD imager having m×n picture elements, wherein the image sensing array and the storage array have the same construction.
Figure 2:
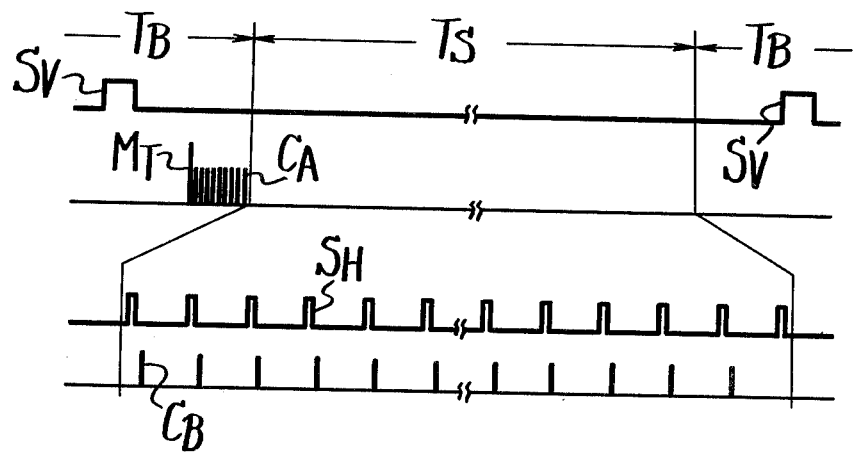
FIG. 2 shows a timing chart of signals related to the operation of the CCD imager shown in FIG. 1.

Solid state imagers such as 3-phase CCD usable in the invention are shown in FIG. 1. FIG. 2 shows a timing chart of the signals related to the operation of the CCD imager shown in FIG. 1. A 3-phase CCD S consists of a photo sensitive array 1 on which a light image of an object (not shown in FIG. 1) is projected. A temporary storage array 2 stores electric charges corresponding to the light information of the image and a read-out register 3 reads out video output signals. The arrays 1, 2 and the register 3 are formed on a semiconductor material such as a monocrystalline silicon substrate. The photo sensitive array 1 has m×n number of picture elements aligned in the horizontal and vertical directions at a predetermined alignment pitch $\tau_H$ in the horizontal direction. Each of the picture elements has one photo sensing cell 5. The photo sensing cells of the picture elements on the odd number horizontal scanning lines are marked with 5a and those on the even number horizontal scanning lines are marked with 5b, respectively.

The light information of the image is converted to corresponding electric charges at parts of a semiconductor substrate facing the photo sensing cells 5 which are connected with electrodes CA (CA1, CA2, and CA3) supplied with image sensing biases having a predetermined potential during a vertical scanning interval $T_S$. Therefore, if a well-known n transfer clock pulses CA which comprises three phase pulses CA1, CA2 and CA3 and follow a marker signal $M_T$ for starting during a vertical retrace interval $T_B$ which also contains a vertical synchronizing signal $S_V$ are applied to the electrodes CA1 to CA3 the electric charges stored in the semiconductor substrate corresponding to the respective picture elements on the horizontal scanning lines are transferred to the temporary storage array 2 and stored at the positions corresponding to the horizontal scanning lines sequentially at every horizontal scanning line. The temporary storage array 2 is formed similarly to the photo sensitive array 1 but is optically shielded as a whole.

The charges stored in the temporary storage array 2 are read out sequentially with a read-out clock pulse or sampling pulse CB which comprises three phase pulses $C_{B1}$, $C_{B2}$, $C_{B3}$ and follows a horizontal synchronizing signal $S_H$ of each horizontal scanning period applied to the read-out register 3. Thus, a video output signal is derived from an output MOS transistor 4 connected to the read-out register 3. The read-out register 3 has the same number of read-out elements aligned in the horizontal direction and corresponding as the picture elements of the array 1 or 2 in one horizontal scanning line.

Figure 3:
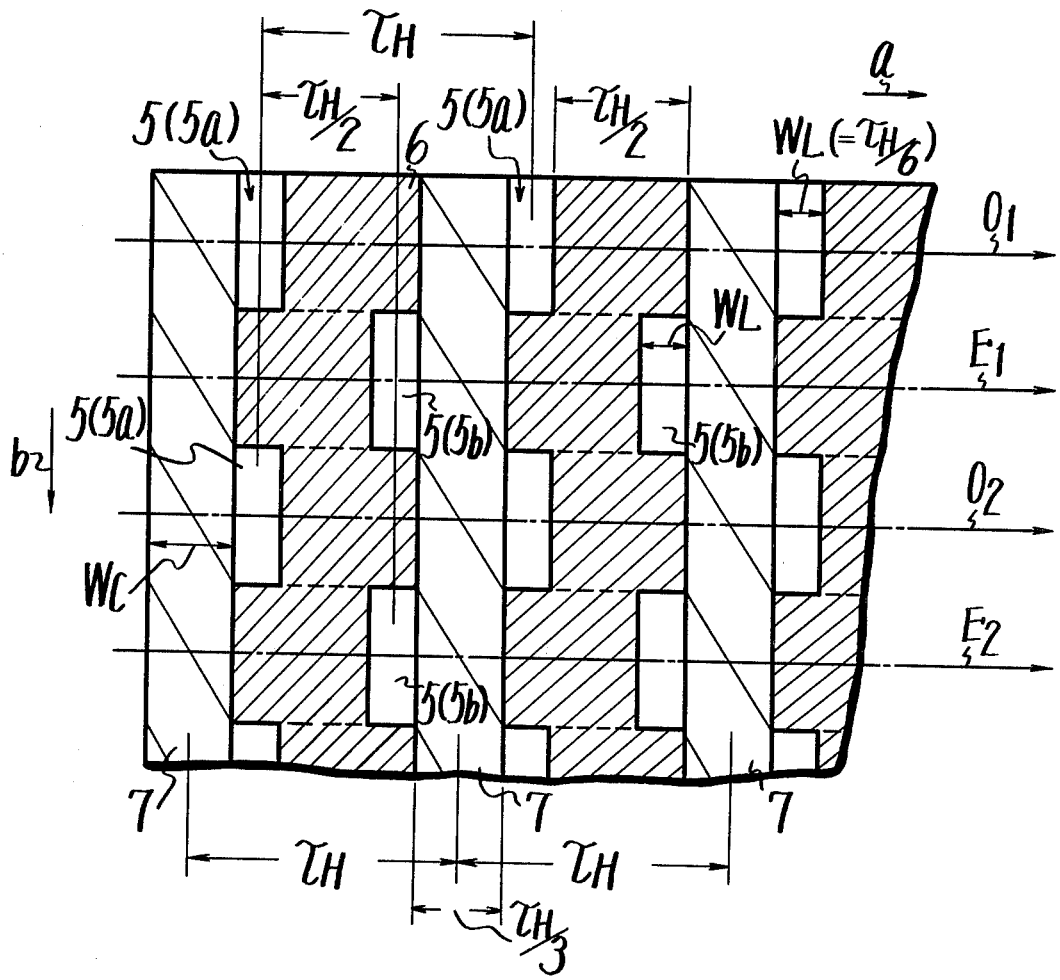
FIG. 3 shows an enlarged and simplified portion of an imager which may be used in conjunction with the present invention.

The CCD S is so constructed that when the light image of the object is cast on the CCD S, a phase difference of 180° is given between a read-out signal $S_o$ obtained from the odd number horizontal scanning line, and a read-out signal $S_E$ obtained from the even number horizontal scanning line. The photo sensing cells 5 formed in the CCD S are arranged to satisfy the positional relationship shown in FIG. 3. FIG. 3 is an enlarged plan view of the photo sensitive array 1. As shown in FIG. 3, if it is assumed that the alignment pitch of the picture elements is taken as $\tau_H$ in the horizontal scanning direction, and the width of each of channel stops 7 formed in a horizontal scanning direction a at every alignment pitch $\tau_H$ is taken as Wc, the width Wc is selected as $\tau_H/3$. In this case, the distance between the photo sensing cells 5a and 5b which must be formed in correspondence with the odd number horizontal scanning lines ($O_1$, $O_2$, $O_3$ . . . ) and the even number horizontal scanning lines ($E_1$, $E_2$, $E_3$ . . . ) in the regions divided by the plurality of channel stops is selected as just $\tau_H/2$.

In the example of FIG. 3, width $W_L$ of the light receiving openings 5a and 5b are selected as $\tau_H/6$, and the distance between the centers of the photo sensing cells 5a and 5b is selected as $\tau_H/2$.

The picture element regions other than the photo sensing cells 5a and 5b are optically shielded with metal layers 6 such as aluminum.

Figure 4:
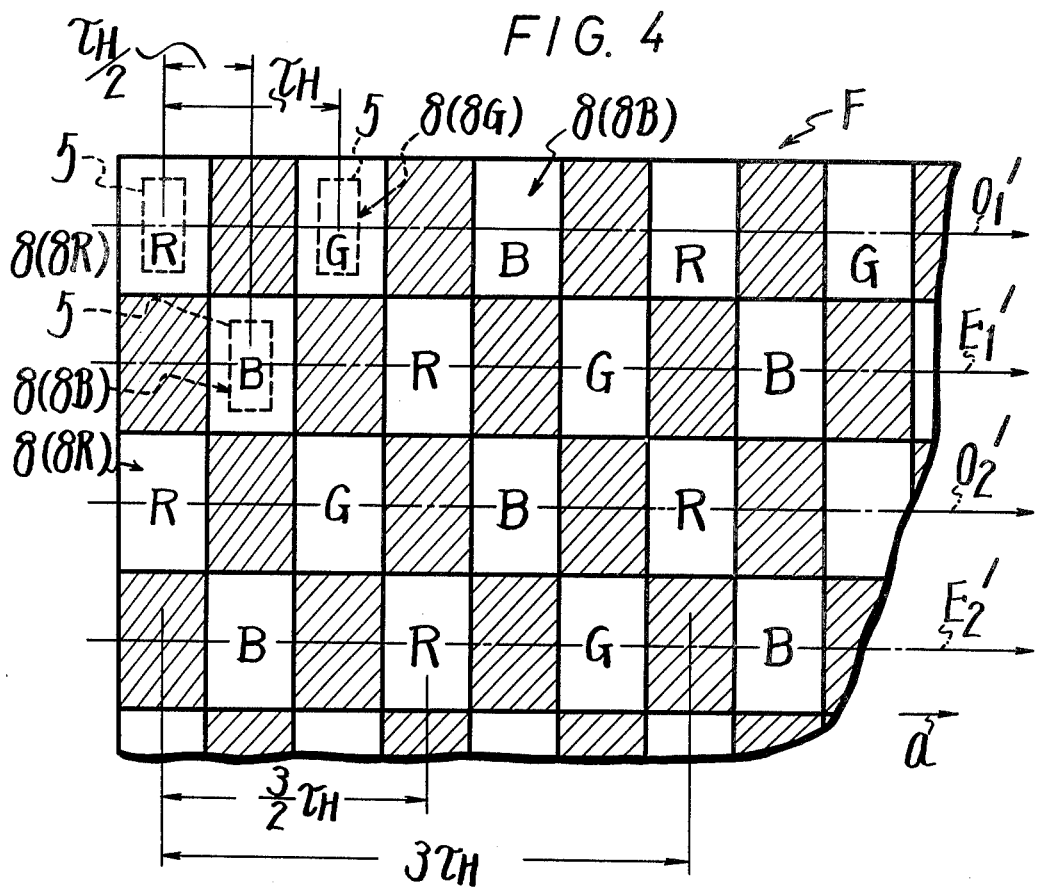
FIG. 4 illustrates a color coding filter which forms part of the new and improved system of the present invention.

A color filter F shown in FIG. 4 is placed in front of the photo sensitive array 1. The color filter F includes a plurality of color filter elements in correspondence with the picture elements of the photo sensitive array 1, the color filter elements 8 of the color filter F being aligned corresponding to the photo sensing cells 5 (5a and 5b). As shown in FIG. 4, the color filter elements 8, each of which has a width $\tau_H/2$, are formed, and the other areas (refer to the cross hatched parts in FIG. 4) are made to be light shielding portions. The color selectivities of the color filter elements 8 are so selected that they pass the desired primary colors. That is, the red color light (R), green color light (G) and blue color light (B) are passed through the color filter elements 8R, 8G, 8B, respectively, alternately and sequentially in the horizontal scanning direction with a predetermined repetition frequency.

The color filter elements in, for example, the odd number horizontal scanning line $O_1'$ are selected such that 1st, 4th, 7th,—in the horizontal scanning direction a pass red color light, 2nd, 5th, 8th,—pass green color light, and 3rd, 6th, 9th,—pass blue color light.

The position of the color filter elements in the even number horizontal scanning line are so selected that the phase of the side band components in the read-out signal obtained by scanning even number scanning line $E_1'$ is displaced by $\pi$ from the phase of the side band components in the read-out signal obtained by scanning the odd number horizontal scanning line $O_1'$. Therefore, as shown in FIG. 4, in the even number horizontal scanning line $E_1'$, the color filter elements pass color light displaced by $\pi$ from the color light passed through the color filter elements in the odd number horizontal scanning line $O_1'$.

Each of the color filter elements (8R) (8G) and (8B) in one horizontal scanning line is placed at every $3\tau_H$, for example, 1st and 4th elements, both for red, are displaced by $3\tau_H$, and each of the color filter elements in odd number horizontal scanning line is displaced by $3\tau_H/2$ from that in the even number horizontal scanning line.

Thus, when an image of an object is projected on the photo sensitive array through the color filter, each of the color signals obtained for red, green and blue from the row of picture elements in odd number horizontal direction $O_1$, $O_2$, $O_3$ . . . has a carrier frequency of $f_s = 1/3\tau_H$ and has a different phase by $\frac{2}{3}\pi$ to each other, and each of the color signals from the row of picture elements in even number horizontal direction $E_1$, $E_2$, $E_3$ . . . has a carrier frequency of $f_s = 1/3\tau_H$ and has a different phase by $\frac{2}{3}\pi$ to each other. The phase of each of the color signals obtained from the odd number horizontal scanning line differs from each of the color signals obtained from the even number horizontal scanning lines by $\pi$, that is, they are out of phase.

Figure 5A:
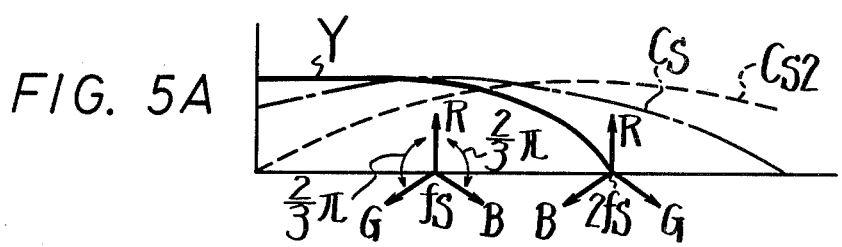
FIG. 5A shows a frequency response curve of a signal obtained from lines $O_1'$, $O_2'$, ... shown in FIGS. 3 and 4.
Figure 5B:
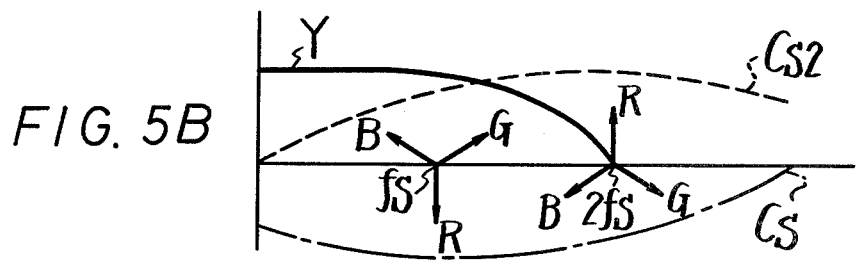
FIG. 5B shows a frequency response curve of a signal obtained from lines $E_1'$, $E_2'$, ... shown in FIGS. 3 and 4.
Figure 5C:
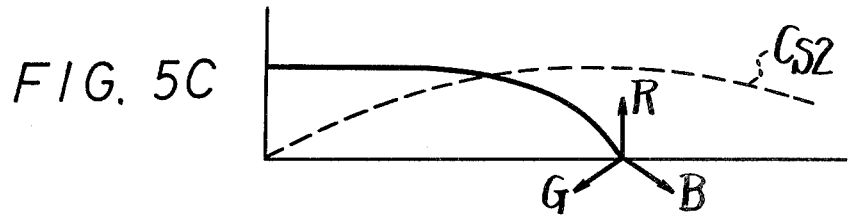
FIG. 5C shows a frequency response curve resulting in mixing of the signals from adjacent lines and illustrating that the original carrier frequency $f_s$ and associated side band components $c_s$ are cancelled.

FIGS. 5A and 5B are frequency response curves of signals obtained from the lines $O_1'$, $O_2'$, . . . , as shown in FIGS. 3 and 4, and from lines $E_1'$, $E_2'$, . . . , as shown in FIGS. 3 and 4. A luminance signal component Y is shown by solid line, color signal component $C_S$ of carrier frequency $f_s$ is shown by - - - - - -, 2nd harmonics of $C_s$ is shown by dotted lines. The phase of each of the color signals is shown by arrows. It will be noted that the vectors at twice the color carrier frequency ($2f_s$) are in phase, but the vectors at the color sub-carrier frequency ($f_s$) are out of phase. Thus, those at $2f_s$ are in phase between odd line signals and even line signals provided that there exists a strong vertical correlation therebetween. Accordingly, by mixing the signals from adjacent lines, the original carrier at $f_s$ and the associated side band components $C_s$ are cancelled as shown in FIG. 5C. Further, if an object to be picked up has only B/W information (in other words no color information), the second harmonic characteristic also disappears.

But it is impossible to remove completely the color signal components of carrier frequency $f_s$ from the luminance signal components, when there is no vertical correlation, and signals $S_o$ and $S_E$ are different from each other. Thus, the mixing of color components with the luminance signal component results erroneous dot-like signals in the reproduced TV picture which are not desirable. Those at $2f_s$ are in phase between odd line signal and even line signal, so those signals at $2f_s$ are not cancelled by adding the signals of one odd line and one even line. A signal level of the second harmonic is roughly proportional to the color saturation of the object being picked up, and the frequency band of the luminance component is restricted theoretically to $f_s$ due to the held signal of the 2nd harmonics. Thus, considering the above, in this invention, the dot-like signal appears on TV screen is eliminated by suppressing the high frequency region of the luminance signal, using the 2nd harmonic signal at $2f_s$.

Figure 6:
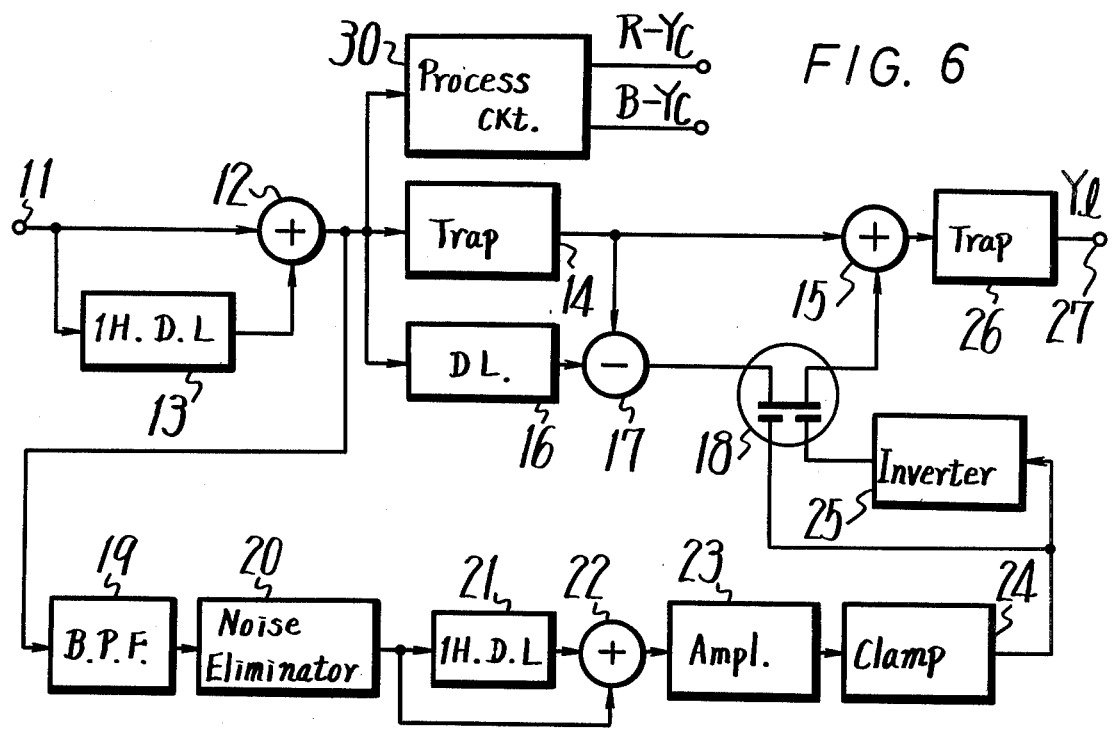
FIG. 6 shows a signal processing circuit to which the present invention is applied.
Figure 7A:
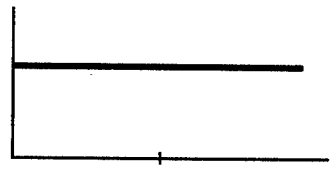
FIGS. 7A, 7B and 7C are frequency response curves.
Figure 7B:
Figure 7C:
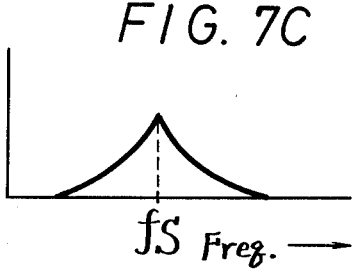

FIG. 6 shows a signal processing circuit embodying the present invention. An input terminal 11 receives an output signal from a CCD imager (FIG. 3) having a color coding filter (FIG. 4). The output signal is supplied to a delay circuit 13 which causes a delay of the time for making one horizontal scan. The output signal is also supplied to an adder 12. So, in the adder 12, the output from odd line $S_O$ and the output from even line $S_E$ are added. Theoretically, the output from the adder 12 is not limited to its frequency band, as shown in FIG. 7A. A carrier trap 14, arranged to trap a frequency of $f_s$, supplies a signal having a response curve such as shown in FIG. 7B. A short time delay 16 is interposed between the adder 12 and a subtractor 17 for compensation of the time delay executed in the carrier trap circuit 14. The subtractor 17 supplies a signal as shown in FIG. 7C, and is connected to the drain of a dual gate MOS field effect transistor (hereinafter referred to as a MOSFET) 18. Both the signal from the carrier trap 14 and a signal at the source of the dual gate MOSFET 18 are supplied to an adder 15. In response to a signal supplied to two gates of the MOSFET 18, the level of the signal as shown in FIG. 7C is controlled and is mixed with the signal of FIG. 7B at the adder 15. The output signal from the adder 12 is also fed to a color encoder and process circuit 30, from which desired signals for standard TV systems are derived.

The output signal from the adder 12 is fed to a band pass amplifier 19, where a carrier of $2f_s$ is selectively amplified and fed to a noise eliminator 20. The noise eliminator 20 may include a level slice circuit, for example, and a noise signal having a lower level is cut out at this point. Another 1H delay 21 and an adder 22 are used to suppress erroneous operation of this invention. Namely, if the object to be picked up has a color pattern which changes from primary color to its complimentary color such as red to cyan, there appears no $2f_s$ carrier components at the output of the adder 12. Under this condition, the level of the $2f_s$ carrier should be high enough to eliminate the signal of 7C at the output of this system. Namely, the $2f_s$ carrier is amplified at an amplifier 23 and is clamped at a clamp circuit 24. The output from the clamp circuit 24 is supplied to one gate of the dual gate MOSFET directly, and to the second gate and by way of an inverter 25. The MOSFET 18 operates to pass a signal between the drain and source when the amplitude of the $2f_s$ carrier is small. A signal supplied to the drain of the MOSFET 18 is amplitude modulated by a carrier $4f_s$ and is obtained at the source thereof. For this reason, a trap circuit 26 having a trap frequency of $4f_s$ is interposed between the adder 15 and the output terminal 27.

Accordingly, if the object to be picked up is colorful and has a high color saturation, the MOSFET 18 cuts out the $f_s$ component of the signal. Therefore, even though there exists no vertical correlation area, the luminance signal removed $f_s$ component is obtained, and erroneous dot-like signals will not appear on the TV screen. Of course, the frequency range of the luminance signal is narrow, but the eyes of a TV watcher are not bothered by this due to the high color saturation. On the contrary, the less the color saturation of the object, the more the $f_s$ component is added to the output signal. Thereby, the frequency range of the luminance signal is broadened. In this case, the $f_s$ component itself is small, and there appears little dot-like signals on the TV screen which does not bother the TV watcher.

Figure 8A:
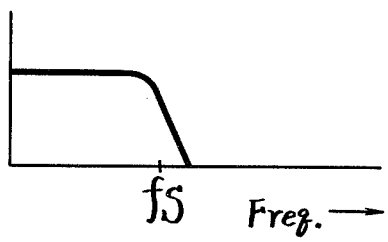
FIGS. 8A and 8B show a modified form of the present invention where the low pass filter supplies the signal of FIG. 8A and a transistor receives the signal as shown in FIG. 8B.
Figure 8B:
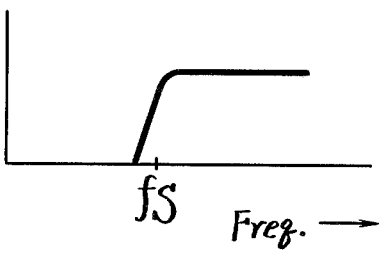

Instead of the trap 14, a low pass filter may be used at cut-off frequency which is $f_s$, and delay time of delay line 16 is selected to compensate the time delay of the low pass filter. In this modified embodiment, the low pass filter supplies a signal shown in FIG. 8A and the drain of the MOSFET 18 receives a signal as shown in FIG. 8B. Thus, the dot-like signals appear on the TV screen are eliminated effectively.

It is apparent that the frequency range is not restricted when the object to be picked up is B/W image, since there are no color components $C_S$ and 2nd harmonics of the same.

This invention is applicable not only to a solid state color camera, but also to vidicon type color cameras.

It will be apparent to those skilled in the art that many modifications and variations may be effected without departing from the spirit and scope of the novel concepts of the present invention.

We claim as our invention:

1. Color camera system in which colors are modulated at a frequency $f_s$ and is obtained in opposite phase line by line comprising:
    (a) means for deriving a composite signal from a pickup device,
    (b) means for shifting the phase by 180° of one horizontal line with respect to an adjacent horizontal line,
    (c) means for mixing said composite signals obtained from adjacent two lines,
    (d) means for checking whether the signal is chromatic,
    (e) means for generating a luminance signal from said mixed composite signal,
    (f) means for detecting a second harmonic component of $f_s$ from said mixed composite signal, and
    (g) means for controlling the frequency response of said luminance signal in response to said second harmonic.

2. A color camera system according to claim 1, which further comprises means for separating said composite signal into a low frequency component and a high frequency component.

3. A color camera system according to claim 2, wherein said controlling means comprises an active element which amplitude modulate said high frequency component by an output of said second harmonic detecting means.

4. A color camera system according to claim 2, wherein said separating means comprises a trap circuit and a subtractor.

5. A color camera system according to claim 2, wherein said separating means comprises a low pass filter and a subtractor.

6. A color camera system according to claim 1, which further comprises a color encoder to derive a desired color signal from said mixed signal.

7. A color camera system in which three primary colors are modulated at a frequency $f_s$ and is obtained in opposite phase line by line comprising:

(a) means for deriving a composite signal from a pickup device,
(b) means for mixing said composite signals obtained from adjacent two lines,
(c) means for generating a luminance signal from said mixed composite signal,
(d) means for detecting a second harmonic component of $f_s$ from said mixed composite signal,
(e) means for controlling the frequency response of said luminance signal in response to said second harmonic, and
(f) means for separating said composite signal into a low frequency component and a high frequency component,
  wherein said controlling means comprises an active element which amplitude modulate said high frequency component by an output of detecting means, and
  wherein said active element is a field effect transistor, in which a drain of said field effect transistor is supplied with said high frequency component and a gate of said field effect transistor is supplied with said output of said detecting means.

8. A color camera system in which three primary colors are modulated at a frequency $f_s$ and is obtained in opposite phase line by line comprising:
(a) means for deriving a composite signal from a pickup device,
(b) means for mixing said composite signals obtained from adjacent two lines,
(c) means for generating a luminance signal from said mixed composite signal,
(d) means for detecting a second harmonic component of $f_s$ from said mixed composite signal, and
(e) means for controlling the frequency response of said luminance signal in response to said second harmonic,
  wherein said pickup device is a charge coupled device in which picture elements of successive two horizontal lines are displaced by $\frac{1}{2}\pi_H$ to each other, where $\pi_H$ is a distance between adjacent two picture elements in one horizontal scanning line.

9. A color camera system comprising:
a color coding filter;
a pickup device from which composite signals are derived where the composite signals containing color components modulated at a frequency $f_s$ are obtained in opposite phase line by line;
an adder mixing said composite signals obtained from adjacent two lines;
a circuit separating high and low frequency components from said mixed composite signal;
a detector detecting a second harmonic component of $f_s$ from said mixed composite signal;
a circuit to derive a control signal from said detected second harmonic of $f_s$;
an active element supplied with said high frequency component and said control signal deriving a modulated output;
an adder mixing said low frequency component and said modulated output; and
a trap circuit suppressing said color components of $f_s$ in said mixed signal.

10. A solid state television camera employing a CCD image sensor having image sensing cells aligned in both horizontal and vertical directions and having color coding filters with which at least two color components are modulated at a frequency of $f_s$, the phase of the signals received from said image sensing cells in one horizontal scanning line being shifted 180° from those in an adjacent horizontal line, means for reading out image information, means for forming a composite signal from said read out information, means for forming a luminance signal from said composite signal, means for detecting a second harmonic of $f_s$ from said composite signal, and means for controlling the frequency response of said luminance signal in response to said second harmonic.

11. A solid state television camera employing a CCD image sensor having image sensing cells aligned in both horizontal and vertical directions and having color coding filters with which at least two color components are modulated at a frequency of $f_s$, the phase of the signals received from said image sensing cells in one horizontal scanning line being shifted 180° from those in an adjacent horizontal line, means for deriving a composite signal from said CCD image sensor, means for forming a luminance signal from said composite signal, means for detecting a second harmonic of $f_s$ from said composite signal, and means for suppressing the high freqency region of said luminance signal in response to said second harmonic.

12. A signal processing circuit comprising an input terminal for receiving the output signal of a CCD imager having a color coding filter, an adder connected to said input terminal, a delay line for delaying the time for making one horizontal scan connecting said input terminal to said adder, a carrier trap for the frequency $f_s$ connected to the output of said adder, a second delay line connected to the output of said adder, a subtractor connected to the output of said second delay line, a second adder connected between the output of said carrier trap, a dual gate MOSFET having its drain-source connected between said subtractor and said second adder, the output of said second adder being connected to a second trap having a trap frequency of $4f_s$, an output terminal connected to the output of said second trap, a processing circuit for deriving color signals connected to the output of said first adder, a band pass filter for passing the second harmonic of said carrier frequency $f_s$ connected to the output of said first adder, a noise eliminator having a level slice circuit connected to the output of said band pass filter, a third delay line connected to the output of said noise eliminator, a third adder connected to the output of said third delay line and also directly to the output of said noise eliminator, an amplifier connected to the output of said third adder, a clamp circuit connected to the output of said amplifier, said clamp circuit being connected to one of said gates of said MOSFET, and an inverter connected to said clamp circuit having its output connected to the second gate of said MOSFET.

* * * * *